(12) United States Patent
Geiser et al.

(10) Patent No.: US 8,950,729 B2
(45) Date of Patent: Feb. 10, 2015

(54) GATE VALVE WITH LINEARLY DISPLACEABLE CLOSING MEMBERS

(71) Applicant: VAT Holding AG, Haag (CH)

(72) Inventors: Friedrich Geiser, Nuziders (AT); Thomas Blecha, Feldkirch (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 13/866,163

(22) Filed: Apr. 19, 2013

(65) Prior Publication Data

US 2013/0277590 A1  Oct. 24, 2013

(30) Foreign Application Priority Data

Apr. 19, 2012  (AT) .................. A 471/2012

(51) Int. Cl.
*F16K 3/14* (2006.01)
*F16K 3/02* (2006.01)
*F16K 3/06* (2006.01)

(52) U.S. Cl.
CPC .............. *F16K 3/14* (2013.01); *F16K 3/0281* (2013.01); *F16K 3/06* (2013.01)
USPC ............................ 251/84; 251/195; 251/284

(58) Field of Classification Search
USPC .................. 251/84, 193–204, 284, 328–329
See application file for complete search history.

(56) References Cited

U.S. PATENT DOCUMENTS

| | | | | |
|---|---|---|---|---|
| 2,148,628 A | * | 2/1939 | Laurent ...................... | 137/246 |
| 3,554,486 A | * | 1/1971 | Thebado .................... | 251/158 |
| 3,695,578 A | * | 10/1972 | Walther et al. ............. | 251/204 |
| 3,993,285 A | * | 11/1976 | Conley ....................... | 251/328 |
| 4,116,419 A | * | 9/1978 | Diehl et al. ................ | 251/196 |
| 4,246,928 A | * | 1/1981 | Burns et al. ............ | 137/315.32 |
| 4,515,174 A | * | 5/1985 | Hollister et al. ............ | 137/72 |
| 4,548,386 A | * | 10/1985 | Gladisch et al. ........... | 251/327 |
| 4,706,934 A | * | 11/1987 | Brown ....................... | 251/197 |
| 5,232,199 A | * | 8/1993 | Thrasher ................... | 251/196 |
| 5,722,636 A | * | 3/1998 | Houston .................... | 251/167 |
| 6,056,267 A | * | 5/2000 | Schneider .................. | 251/204 |
| 6,367,770 B1 |  | 4/2002 | Duelli | |
| 7,011,294 B1 | * | 3/2006 | Ehrne et al. ............... | 251/328 |

FOREIGN PATENT DOCUMENTS

| | | |
|---|---|---|
| CH | 239078 | 9/1945 |
| DE | 37685 | 4/1886 |
| DE | 1957309 | 5/1970 |
| WO | 2011088482 | 7/2011 |

\* cited by examiner

*Primary Examiner* — John Bastianelli
(74) *Attorney, Agent, or Firm* — Volpe and Koenig, P.C.

(57) ABSTRACT

Valve (1), in particular vacuum valve, having a passage opening (2) and a closure member (3), it being possible for the closure member (3) to be moved by a valve drive (4) of the valve (1) in a closing direction (5) from an open position, in which it releases the passage opening (2), into a closed position, in which it closes the passage opening (2), and in the reverse direction. The closure member (3) is arranged in the closed position between two valve seats (6, 7) which lie opposite one another and surround the passage opening (2), and a first closure member part (8) of the closure member (3) bears against a first of the valve seats (6) in the closed position and a second closure member part (9) bears against the second valve seat (7) in the closed position. The closure member parts (8, 9) are mounted such that they can be displaced relative to one another in the closing direction (5).

9 Claims, 7 Drawing Sheets

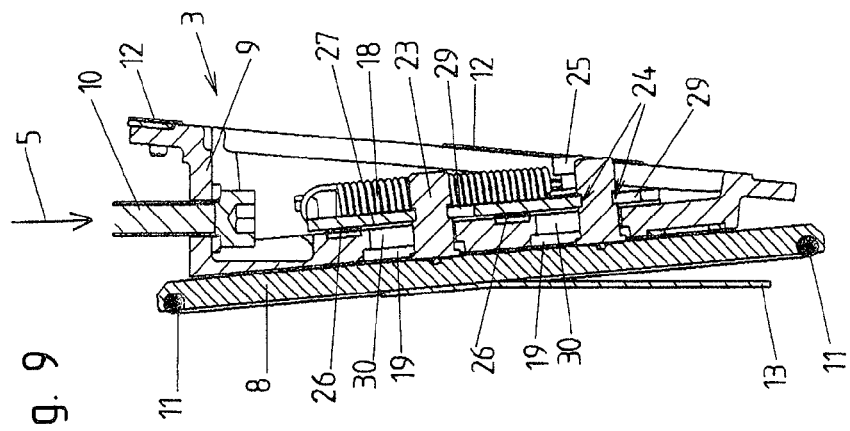
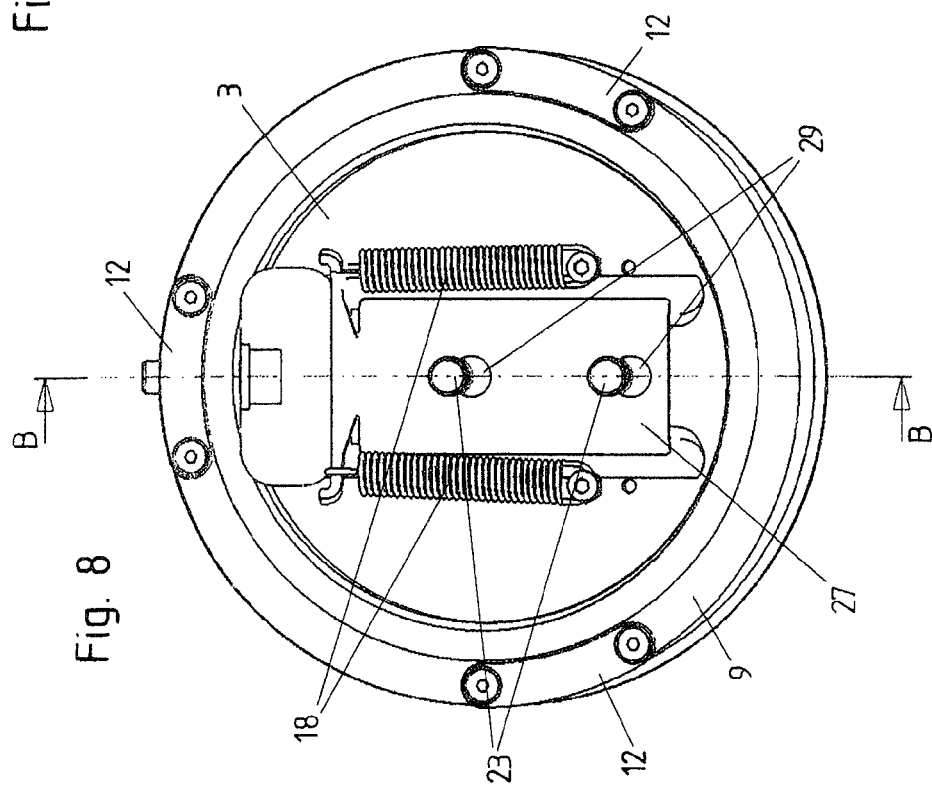
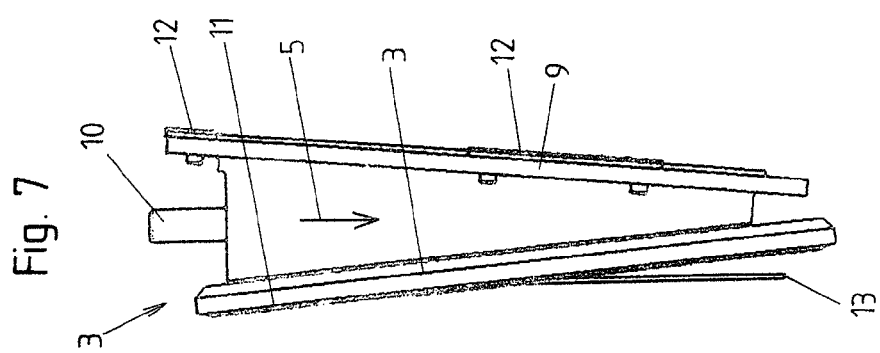

GATE VALVE WITH LINEARLY DISPLACEABLE CLOSING MEMBERS

INCORPORATION BY REFERENCE

The following documents are incorporated herein by reference as if fully set forth: Austrian Patent Application A471/2012, filed Apr. 19, 2012.

BACKGROUND

The present invention relates to a valve, in particular a vacuum valve, having a passage opening and a closure member, it being possible for the closure member to be moved by a valve drive of the valve in a closing direction from an open position, in which it releases the passage opening, into a closed position, in which it closes the passage opening, and in the reverse direction, the closure member being arranged in the closed position between two valve seats which lie opposite one another and surround the passage opening, and a first closure member part of the closure member bearing against a first of the valve seats in the closed position and a second closure member part bearing against the second valve seat in the closed position. WO 2011/088482 A1 has disclosed a generic valve of the abovementioned type. The two closure member parts which are shown there and bear against the valve seats in the closed position are arranged in a V-shape with respect to one another as viewed in cross section and are both pressed with their seals against the respective valve seat by a spreading wedge of the valve drive being moved downward.

SUMMARY

It is the object of the invention to provide an alternative refinement of a valve of this type.

To this end, it is provided according to the invention that the closure member parts are mounted such that they can be displaced relative to one another in the closing direction.

In contrast to the stated prior art, in which the closure member parts are pivoted apart from one another by the spreading wedge, displaceability of the closure member parts relative to one another in the closing direction is therefore provided here. Here, the closure member parts are preferably mounted such that they can be displaced relative to one another linearly, particularly preferably exclusively linearly. It is also particularly preferred if the closure member parts are mounted such that they can be displaced relative to one another in the closing direction with respect to one another.

It can be provided, for example, that one of the closure member parts, preferably the second closure member part, is mounted such that it cannot be displaced at least in the closing direction on a valve drive part of the valve drive, which valve drive part carries the closure member. The other closure member part, preferably the first closure member part, can be mounted such that it can be displaced on the valve drive part which carries the closure member. The valve drive part can be, for example, a push rod of the valve drive.

Refinements of the invention which are particularly inexpensive to produce provide that only one of the closure member parts, preferably the first closure member part, bears against one of the valve seats, preferably against the first valve seat, in a sealed manner by at least one seal in the closed position. In refinements of this type, the other, that is to say preferably the second, closure member part then has no sealing action, but rather only a supporting action. It can then also serve in these refinements to press the closure member part with the seal onto the valve seat which is assigned to it. For the sake of completeness, it is to be noted that the seal can be arranged on the stated closure member part or on the valve seat. Variants are even conceivable, in which at least one seal is arranged on the closure member part and at least one seal is arranged on the valve seat. It can also be provided that one of the closure member parts, preferably the second closure member part, bears against one of the valve seats, preferably against the second valve seat, by at least one sliding face in the closed position.

Particularly preferred refinements of the invention provide that, starting from the open position, the two closure member parts are first of all moved jointly in the closing direction until an intermediate position is reached. At this intermediate position, the closure member is favorably already arranged between the valve seats. However, none of the closure member parts is already pressed sealingly against the respective valve seat in this intermediate position. By further displacement of the valve drive or its valve drive part in the closing direction, one of the closure member parts is then displaced relative to the other closure member part which is no longer moved further, until the final closed position is reached, in which at least one of the closure member parts is pressed sealingly onto the valve seat. In order to hold one of the closure member parts fixedly once this stated intermediate position has been reached, preferred refinements provide that only one of the closure member parts, preferably the first closure member part, is assigned at least one stop for stopping the said closure member part during a movement in the closing direction. It is once again favorable, as said, if, following the stopping of one of the closure member parts by the stop, the other closure member part, preferably the second closure member part, can be moved further in the closing direction.

Preferred refinements of the invention provide that preferably only one of the closure member parts, preferably the first closure member part, is assigned at least one stop for stopping the said closure member part during a movement in the closing direction. Preferably at least in the closed position, the stop is arranged on a side, facing away from the closure member part, of that valve seat, against which the closure member part bears in the closing direction. It is favorable if, at least in the closed position, the stop is arranged outside an intermediate region between two closing planes, the first valve seat being arranged in one of the closing planes and the second valve seat being arranged in the other closing plane. At least in the closed position, the stop is preferably arranged on the side, facing away from the other closure member part, of the closure member part which is assigned the stop.

In the context of a simple, space-saving embodiment, it is favorable if the stop is arranged fixedly on one of the closure member parts. The stop preferably projects at least in regions from the said closure member part. The stop can come into contact with the wall which surrounds the passage opening.

For the restoring during the opening movement counter to the closing direction, preferred variants provide that at least one restoring spring acts between the closure member parts, which restoring spring restores one of the closure member parts, preferably the first closure member part, during the movement of the closure member counter to the closing direction into an initial position relative to the other closure member part, preferably the second closure member part.

In order to produce as few frictional losses as possible between the closure member parts, it is preferably provided if the closure member parts bear against one another by at least one sliding face.

The valves according to the invention are preferably what are known as wedge valves. It is therefore preferably provided that a closing plane of the first valve seat is arranged at an acute angle with respect to a closing plane of the second valve seat. The closing plane of the respective valve seat is the plane in which the respective closure member part bears against the valve seat. In particular, the closure member part which bears sealingly against its valve seat by a seal can be of plate-shaped formation. Here, the closure member part can have a round or polygonal contour or a circumferential contour which is shaped in any desired way.

In the context of closing paths which are as small as possible, it is favorable if a closing plane of the valve seat, against which one of the closure member parts bears in the closed position with the interposition of a seal, is arranged at an acute angle with respect to the closing direction. It is favorably provided that the closing plane of the said valve seat, against which one of the closure members bears in the closed position with the interposition of a seal, is arranged obliquely with respect to a throughflow direction, in which the passage opening can be flowed through in the open position.

According to the invention, valves are preferably used in what is known as vacuum technology. In vacuum technology, for example, workpieces are machined in a negative pressure or vacuum chamber or other processes are carried out with the elimination of environmental influences. The term vacuum technology is used as a rule for operating states with pressures which are less than or equal to 0.001 mbar or 0.1 Pa. In particular, those valves which are suitable and designed for use in low-pressure operating states of this type, that is to say in vacuum technology, are called vacuum valves. They can be used as openings and as closure of corresponding vacuum chambers. The workpiece to be machined can be introduced through them into the vacuum chamber and can be removed through them from the latter. However, they can also be provided for gas metering or liquid metering.

BRIEF DESCRIPTION OF THE DRAWINGS

Further features and details of preferred exemplary refinements of the invention will be explained using the following description of the figures, in which:

FIG. 7 shows a side view of the closure member of said valve, FIG. 8 shows a side view of the second closure member part, FIG. 9 shows the section along the sectional line BB from FIG. 8.

DETAILED DESCRIPTION OF THE PREFERRED EMBODIMENTS

Figure 3:
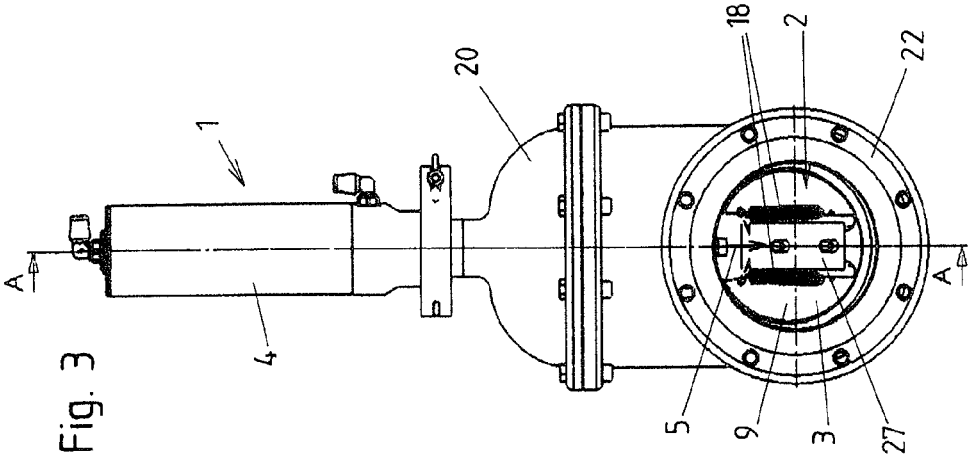
FIGS. 1 to 3 show side views of the first exemplary embodiment according to the invention of a vacuum valve from three different directions.
Figure 2:
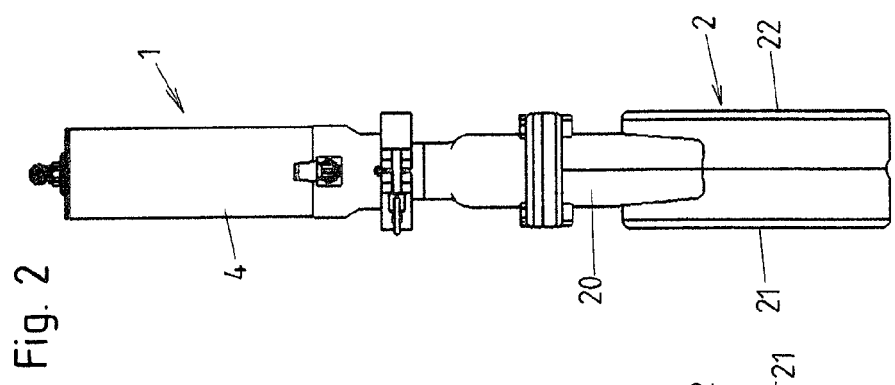
Figure 1:
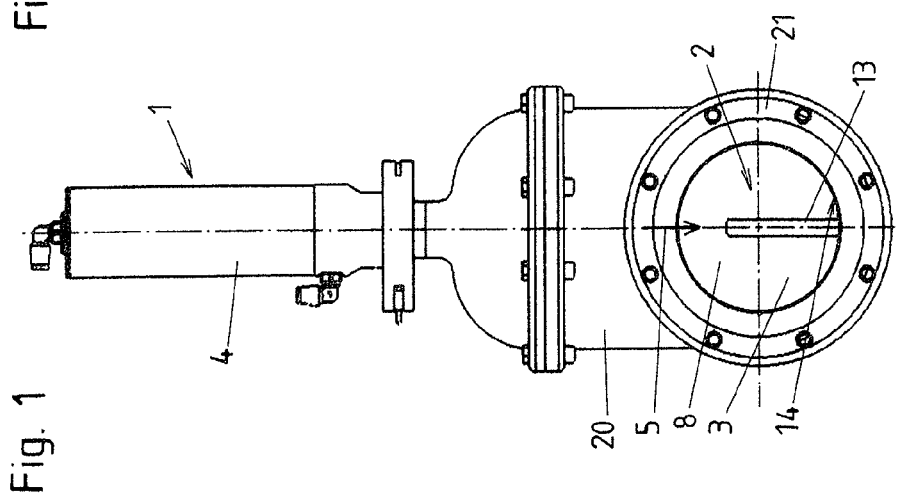

It can be seen clearly in the side views according to FIGS. 1 to 3 that the first vacuum valve 1 according to the invention which is described here by way of example has a housing 20. In the latter, the passage opening 2 is also situated which is closed by the closure member 3 in its closed position. The valve drive 4 serves to adjust the closure member 3 between its open position and its closed position. As is known in the prior art, it can be configured to be electric, hydraulic, pneumatic or can be configured in some other suitable way. In the exemplary embodiment which is shown, and also in other preferred variants, the valve drive 4 performs exclusively a linear movement. The closure member 3 is therefore moved in its entirety either in the closing direction 5 or counter to the closing direction 5.

Through use of the connection flanges 21 and 22, the vacuum valve 1 can be fastened with its housing 20 to a vacuum chamber or between two vacuum chambers. This is of course only one of many possible uses of valves according to the invention or vacuum valves 1. The arrow 5 shows the closing direction, in which the closure member 3 is moved by the valve drive 4, coming from the open position, toward the closed position. The opening direction which is not shown in addition here is the counterdirection to the closing direction 5. In FIG. 1, the first closure member part 8 can be seen with its stop 13 which comes into contact with the wall 14 of the housing 20. The wall 14 surrounds the passage opening 2.

FIG. 3 shows the view from the opposite direction. Here, the second closure member part 9 of the closure member 3, the restoring springs 18 and the carrier plate 27 are seen, the function of which will be described in greater detail further below.

Figure 6:
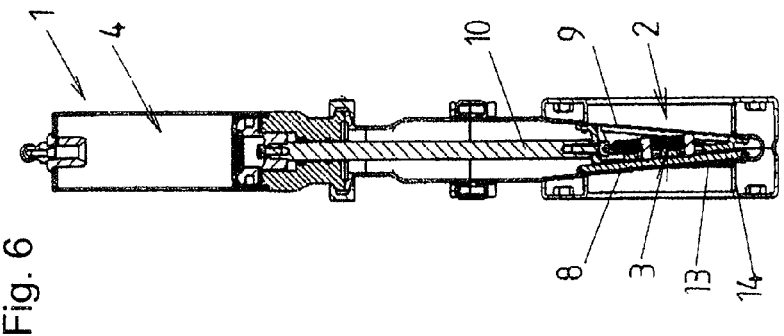
FIGS. 4 to 6 show sections along the sectional line AA from FIG. 3, the closure member being situated in the open position in FIG. 4, in an intermediate position in FIG. 5 and in the closed position in FIG. 6.
Figure 5:
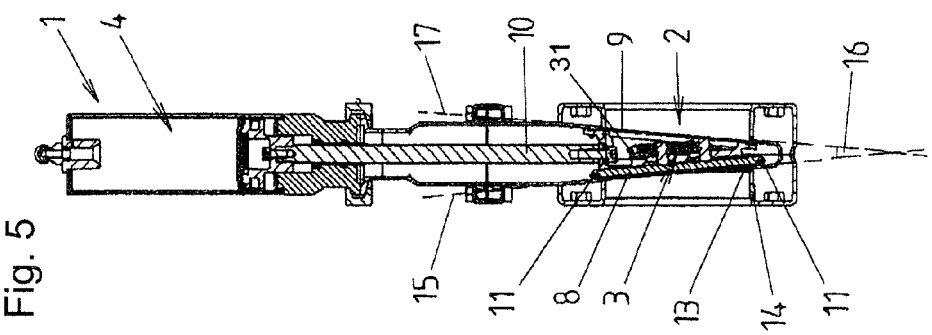
Figure 4:
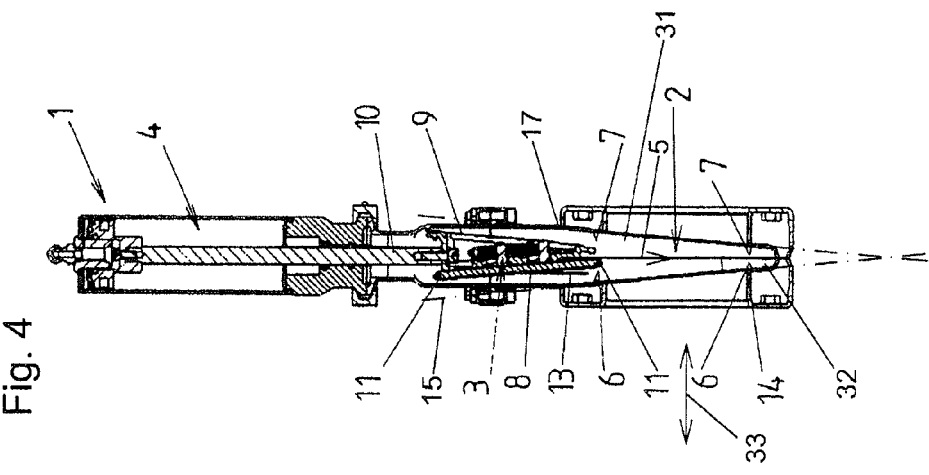

FIGS. 4 to 6 now show sections along the sectional line AA. In FIG. 4, the closure member 3 is situated in the open position, in which the passage opening 2 is open completely. In FIG. 5, the intermediate position is reached, in which the first closure member part 8 is stopped by the stop 13 and is held fixedly during the further movement of the second closure member part 9. FIG. 6 shows the closed position, in which the first closure member part 8 is pressed sealingly against its valve seat 6 with the interposition of the seal 11, whereas the second closure member part 9 is supported on the second valve seat 7. It can also be seen that the valve drive is configured as a piston/cylinder unit in the exemplary embodiment which is shown. This can be operated pneumatically as well as hydraulically. The valve drive part 10, in the form of the valve rod here, is situated on the piston, on which valve drive part 10 the second closure member part 9 is arranged such that it cannot be displaced, at least as viewed in the closing direction 5. It can be seen particularly clearly in the illustrations according to FIGS. 4 to 6 that the embodiment which is shown here is configured as a wedge valve. This can be seen by the fact that the two valve seats 6 and 7 or their closing planes 15 and 17 are arranged at an acute angle 16 with respect to one another.

It can also be seen clearly in FIG. 4 that the closing plane 15 of that valve seat, against which the closure member part 8 bears in the closed position with the interposition of the seal 11, is arranged at an acute angle 32 with respect to the closing direction 5. The closing plane 15 and the valve seat 6 are therefore arranged obliquely with respect to the throughflow direction 33.

In FIG. 4, the closure member 3 is situated, as said, in the open position, in which the passage opening 2 is open, that is to say workpieces or media such as gases or liquids can pass through the passage opening 2. In order to close the valve 1, the valve drive 4 first of all displaces the entire closure member 3 in the closing direction 5 by its piston rod 10. During this displacement movement, the first and the second closure member parts 8 and 9 remain in a fixed spatial relationship with respect to one another. This first phase of the closing movement ends in the intermediate position according to FIG. 5. In the latter, the stop 13 which is attached to the first closure member part 8 which is configured here as a valve head comes into contact with the wall 14 which surrounds the passage opening 2. The first closure member part 8 is stopped as a result. From here, it can no longer be moved further in the closing direction 5. By further actuation of the valve drive 4 in the closing direction 5, the valve drive part 10, in the form of the push rod, is displaced further in the closing direction 5 together with the second closure member part 9 which is arranged fixedly on it with regard to the closing direction. This therefore results in the displacement movement, made possible according to the invention, of the two closure member parts 8 and 9 in the closing direction 5 relative to one another. During this displacement movement, the second closure member part 9 then slides along on the second valve seat 7 by the sliding faces 12 which will be explained in greater detail further below. The acute-angled arrangement of the closing planes 15 and 17 achieve a wedge action which presses the first closure member part 8 with its seal 11 sealingly against the first valve seat 6. In this refinement of the invention, no sealing action is achieved between the second valve seat 7 and the second closure member part 9. The final closed position is reached in FIG. 6. In this position, the first closure member part 8 is pressed sufficiently fixedly against the first valve seat 6 which is assigned to it, as a result of the stated wedge action.

In order to open, that is to say to move the closure member 3 counter to the closing direction 5 into the open position according to FIG. 4, the valve drive 4 pulls the valve drive part 10 and therefore also the second closure member part 9 upward. As a result, a relative movement occurs once again between the first closure member part 8 and the second closure member part 9, until the intermediate position according to FIG. 5 is reached. From here, the first closure member part 8 is also raised up and the entire closure member 3 is moved upward into the open position according to FIG. 4. The restoring springs 18 assist the restoring movement between the first and second closure member parts 8 and 9.

The stop 13 of this exemplary embodiment, which stop 13 is attached to the closure member part 8 and stops the closure member part 8 in the stated intermediate position during its movement in the closing direction 5, is arranged outside the intermediate region 31 between the two closing planes 15 and 17 in this exemplary embodiment and in other preferred refinements. The stop 13 is therefore situated on a side, facing away from the closure member part 8, of that valve seat 6, against which the closure member 8 bears in the closed position. The stop 13 is situated on that side of the closure member part 8 which faces away from the other closure member part 9. In the closed position, the stop 13 comes into contact with a wall 14 of the housing 20, which wall 14 lies outside the intermediate region 31 between the closing planes 15 and 17.

Figure 10:
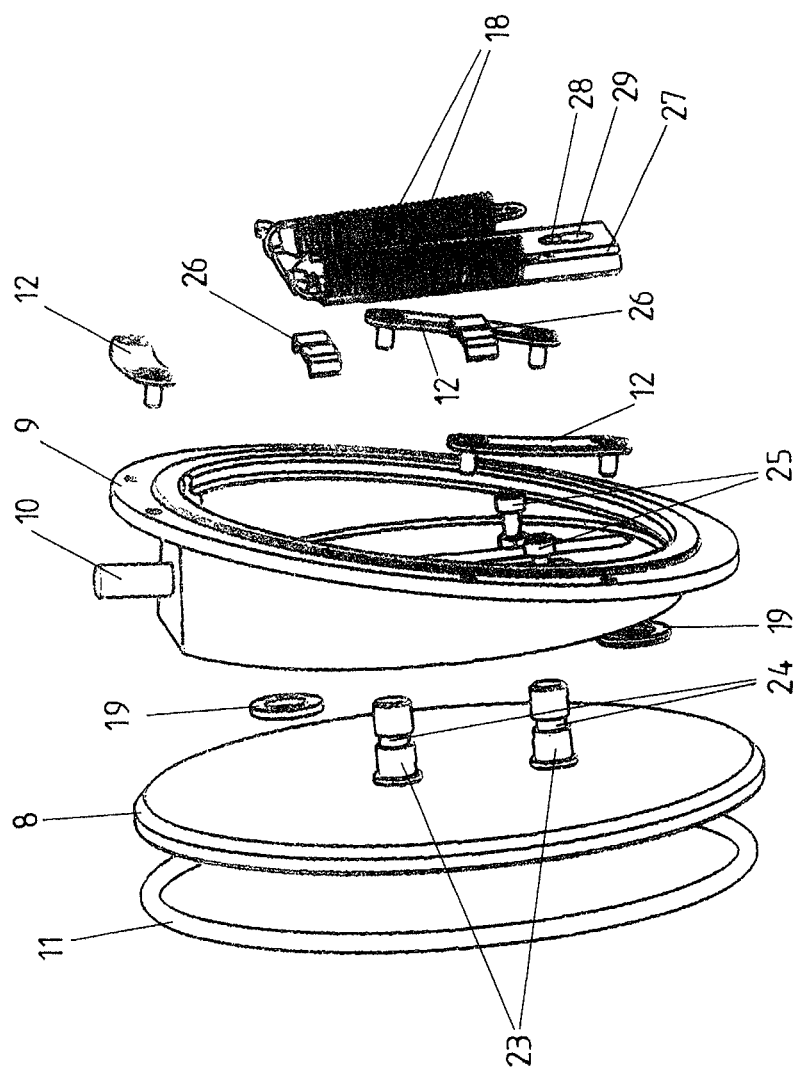
FIG. 10 shows an exploded illustration of the various components of the said closure member.

In order for it to be possible to explain the precise construction of the closure member 3 of this exemplary embodiment in detail, said closure member 3 is shown in FIGS. 7 and 10 in a manner which is detached from the other components of the valve 1. FIG. 7 shows a side view of the narrow side of the closure member 3. FIG. 8 shows a view of the second closure member part 9 and the sectional line BB. The section along the said sectional line BB is shown in FIG. 9. FIG. 10 shows an exploded illustration.

As can be seen particularly clearly in FIGS. 9 and 10, the first closure member part 8 which is configured here as a valve head carries the seal 11 in this exemplary embodiment. This does not have to be the case of course. The seal can also be arranged on the valve seat. Firstly the stop 13 and secondly also the guide journals 23 are arranged fixedly with the closure member part 8. The guide journals 23 penetrate corresponding slots 30 in the second closure member part 9. Furthermore, the guide journals 23 have in each case one groove 24, with which they are arranged in corresponding receiving grooves 28 of the carrier plate 27. The carrier plate 27 serves as fastening for the restoring springs 18 which are fastened at their other end via the fastening journals 25 to the second closure member part 9. The widened portions 29 of the receiving grooves 28 serve merely for the guide journals 23 to be plugged through the receiving grooves 28 during assembly. The widened portions 29 can therefore also be omitted if the guide journals 23 were configured correspondingly in two pieces, for example by a screw connection.

Whereas the first closure member part 8 can bear against the first valve seat 6 by the seal 11, no seal is provided on the second closure member part 9 and also on the second valve seat 7. In the exemplary embodiment which is shown, the second closure member part 9 is rather supported via the sliding faces 12 on the second valve seat 7 when the displacement movement between FIGS. 5 and 6 takes place. In order to facilitate the sliding along one another of the two closure member parts 8 and 9, the said sliding faces 19 are provided between them. The carrier plate 27 which is arranged on the first closure member part 8 such that it cannot be displaced as viewed in the closing direction 5 slides by the slides 26 on the second closure member part 9. In general, it is to be noted that the sliding faces 12 and 19 and 26 can both, as realized here, be configured as small sliding plates, for example made from Teflon, or else can be configured as a friction-reducing coating or the like. Corresponding lubrication is also conceivable.

As a result of the arrangement which is shown, firstly the displaceability according to the invention of the two closure member parts 8 and 9 relative to one another is realized. Secondly, the said two closure member parts 8 and 9 are also prestressed in this exemplary embodiment by the restoring springs 18 in the opening direction which lies opposite to the closing direction 5, in order to ensure the desired restoring action.

FIGS. 11 to 16 then show a second exemplary embodiment according to the invention of a valve 1. Two essential differences from the first exemplary embodiment consist in the fact that firstly the valve drive 4 can be operated by hand here. This is a lever 34, by way of which the closure member 3 can be pivoted in the closing direction 5 into its closed position and in the opposite direction into its open position by corresponding manual pivoting about the pivot axis 35. The second fundamental difference from the first exemplary embodiment consists in the fact that the closure member 3 does not carry out a linear movement but rather a pivoting movement on a circular path section during its travel between the open position and the closed position and vice versa.

Figure 12:
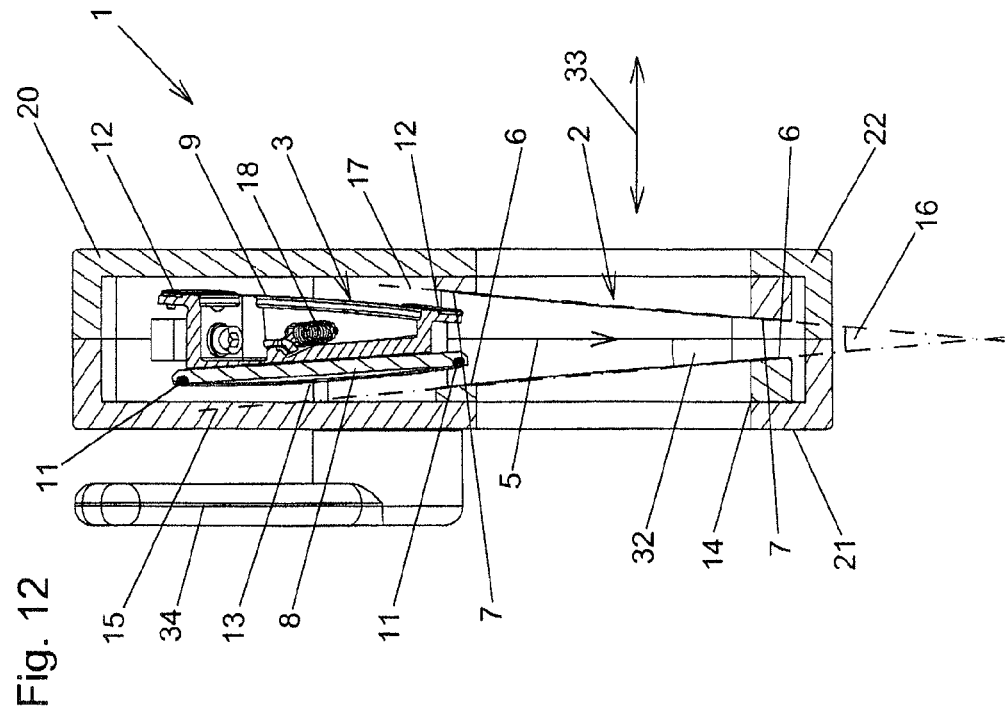
FIGS. 11 to 16 show illustrations with respect to a second exemplary embodiment.
Figure 11:
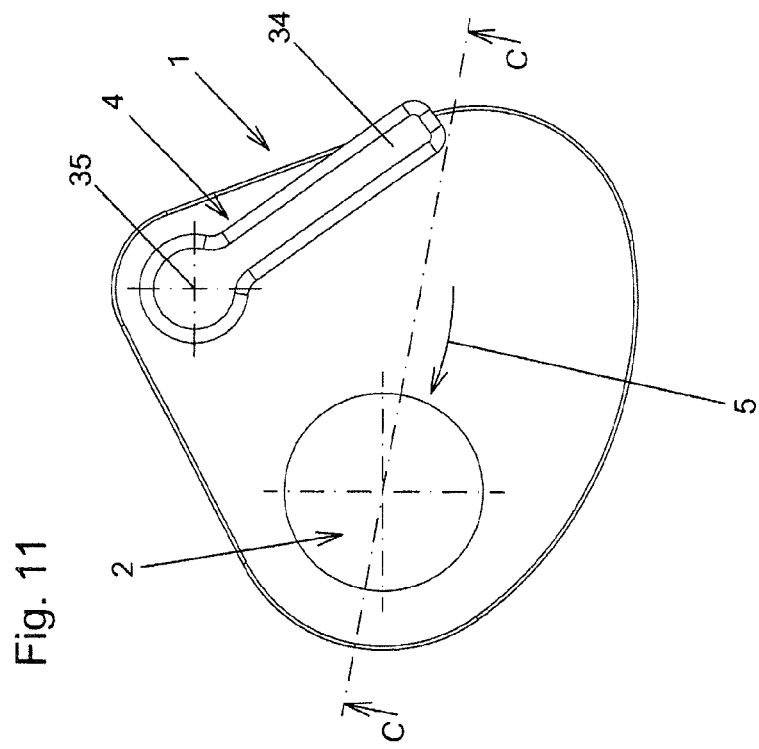
Figure 14:
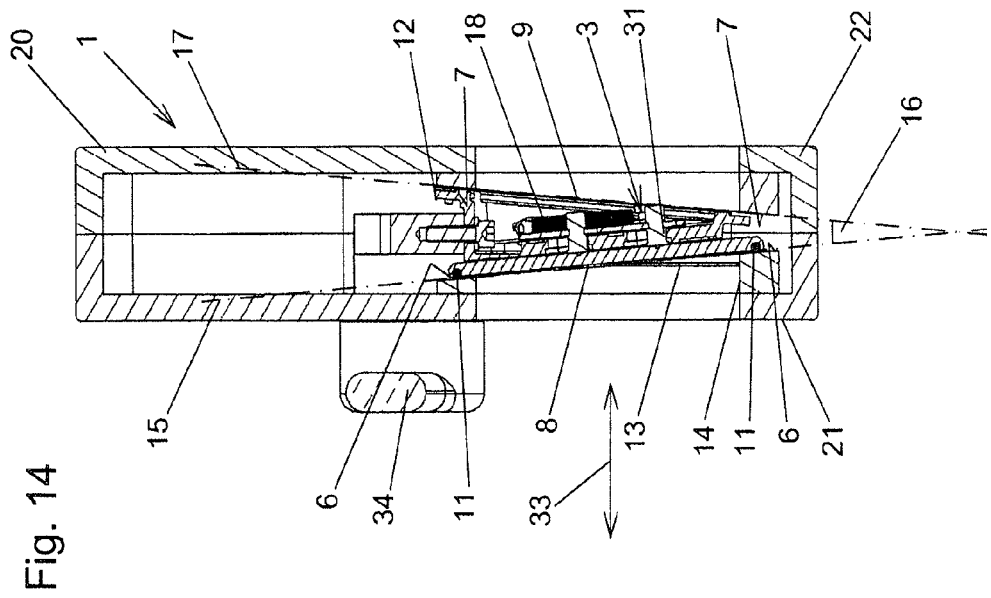
Figure 13:
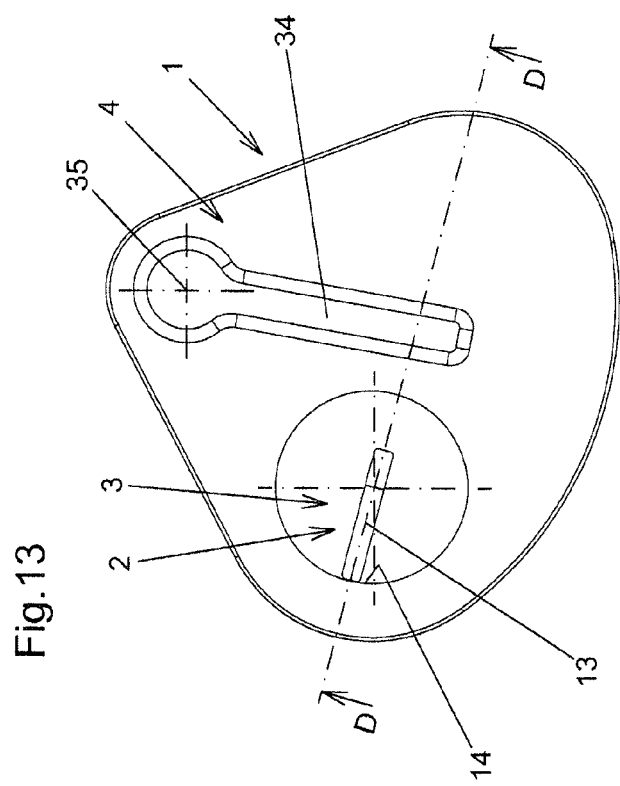
Figure 16:
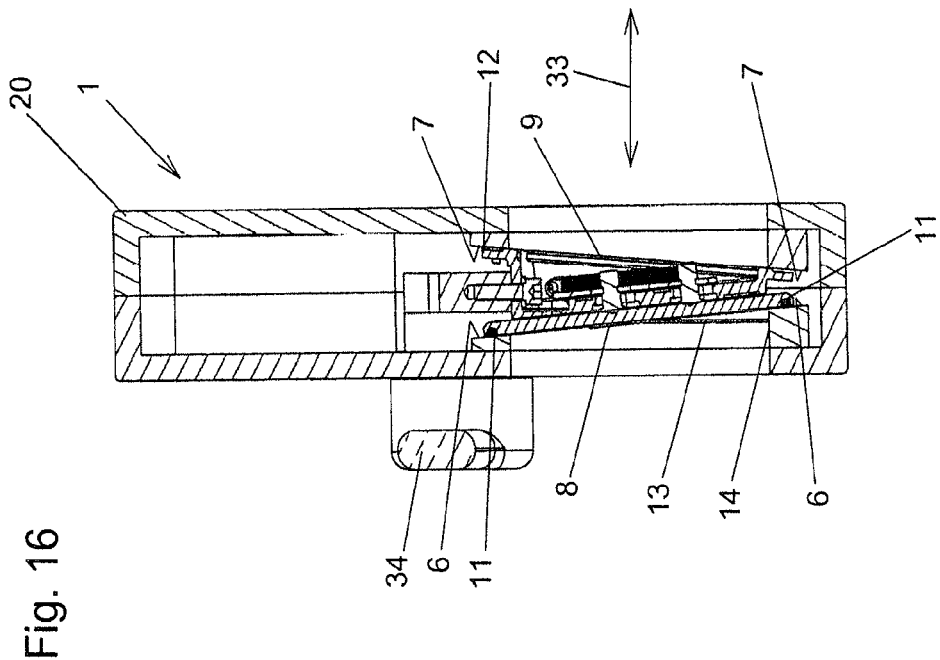
Figure 15:
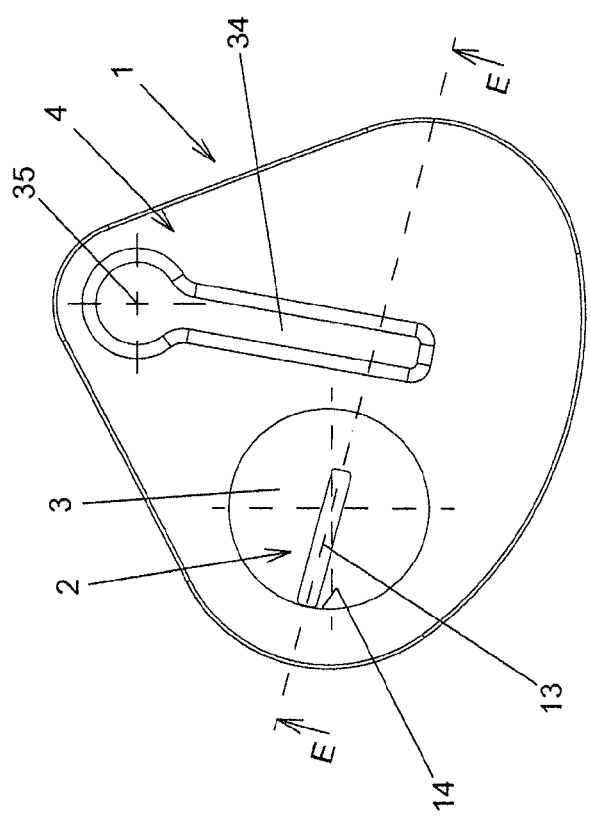

FIG. 11 shows a view of the said second valve 1 according to the invention in the open position, in which the closure member 3 completely releases the passage opening 2. FIG. 12 shows the section along the sectional line CC. FIGS. 13 and 14 show the intermediate position, in which the stop 13 has just come into contact with the wall 4, but the two closure member parts 8 and 9 have not yet been displaced relative to one another in the closing direction 5. In this position, the first closure member 8 bears with its seal 11 as it were only loosely against the first valve seat 6. FIG. 14 shows the section along the sectional line DD from FIG. 13. FIGS. 15 and 16 show the closed position, FIG. 16 showing the section along the sectional line EE from FIG. 15.

The construction of the closure member 3 with the stop 13 and also the displacement relative to one another of the closure member parts 8 and 9 between the intermediate position according to FIGS. 13 and 14 and the closed position according to FIGS. 15 and 16 correspond to the first exemplary embodiment, with the result that no additional explanations appear to be necessary here. For the sake of completeness, it is noted that these are of course only two exemplary embodiments of the invention. Of course, pivotable closure members 3 can also be driven by a motor, hydraulic, electric or other valve drive. It is equally possible for valve drives with linear movements as in the first exemplary embodiment of course to also be actuated manually.

LIST OF REFERENCE NUMERALS

1 Valve
2 Passage opening
3 Closure member
4 Valve drive
5 Closing direction
6 First valve seat
7 Second valve seat
8 First closure member part
9 Second closure member part
10 Valve drive part
11 Seal
12 Sliding face
13 Stop
14 Wall
15 Closing plane
16 Angle
17 Closing plane
18 Restoring spring
19 Sliding face
20 Housing
21 Connection flange
22 Connection flange
23 Guide journal
24 Groove
25 Fastening journal
26 Slide
27 Carrier plate
28 Receiving groove
29 Widened portion
30 Slot
31 Intermediate region
32 Acute angle
33 Throughflow direction
34 Lever
35 Pivot axis

The invention claimed is:

1. A valve comprising: a passage opening, a closure member, and a valve drive, the closure member is movable via the valve drive in a closing direction from an open position, in which the passage opening is released, into a closed position, in which the closure member closes the passage opening, and in a reverse direction, the closure member being arranged in the closed position between two valve seats which lie opposite one another and surround the passage opening, and a first closure member part of the closure member bears against a first of the valve seats in the closed position and a second closure member part of the closure member bears against the second valve seat in the closed position, and the closure member parts are mounted displaceable relative to one another in the closing direction, wherein one of the closure member parts is assigned at least one stop that stops said closure member part during a movement in the closing direction, the stop being arranged, at least in the closed position, on a side, facing away from the closure member part, of the valve seat, against which the closure member part bears in the closed position; and
wherein a closing plane of the valve seat, against which one of the closure member parts bears in the closed position with the interposition of a seal, is arranged at an acute angle with respect to the closing direction.

2. A valve comprising: a passage opening, a closure member, and a valve drive, the closure member is movable via the valve drive in a closing direction from an open position, in which the passage opening is released, into a closed position, in which the closure member closes the passage opening, and in a reverse direction, the closure member being arranged in the closed position between two valve seats which lie opposite one another and surround the passage opening, and a first closure member part of the closure member bears against a first of the valve seats in the closed position and a second closure member part of the closure member bears against the second valve seat in the closed position, and the closure member parts are mounted displaceable relative to one another in the closing direction, wherein one of the closure member parts is assigned at least one stop that stops said closure member part during a movement in the closing direction, the stop being arranged outside an intermediate region between two closing planes defined by the valve seats at least in the closed position, the first valve seat being arranged in one of the closing planes and the second valve seat being arranged in the other closing plane; and
wherein a closing plane of the valve seat, against which one of the closure member parts bears in the closed position with the interposition of a seal, is arranged at an acute angle with respect to the closing direction.

3. A valve comprising: a passage opening, a closure member, and a valve drive, the closure member is movable via the valve drive in a closing direction from an open position, in which the passage opening is released, into a closed position, in which the closure member closes the passage opening, and in a reverse direction, the closure member being arranged in the closed position between two valve seats which lie opposite one another and surround the passage opening, and a first closure member part of the closure member bears against a first of the valve seats in the closed position and a second closure member part of the closure member bears against the second valve seat in the closed position, and the closure member parts are mounted displaceable relative to one another in the closing direction, wherein one of the closure member parts is assigned at least one stop that stops said closure member part during a movement in the closing direction, the stop being arranged on that side of the closure member part which faces away from the other closure member part at least in the closed position; and
wherein a closing plane of the valve seat, against which one of the closure member parts bears in the closed position with the interposition of a seal, is arranged at an acute angle with respect to the closing direction.

4. The valve according to claim 1, wherein one of the closure member parts is assigned at least one stop that stops said closure member part during a movement in the closing direction.

5. The valve according to claim 4, wherein, following the stopping of one of the closure member parts via the stop, the other closure member part is moveable further in the closing direction.

6. The valve according to claim 4, wherein the stop is arranged fixedly on the one of the closure member parts, and comes into contact with a wall which surrounds the passage opening.

7. The valve according to claim 1, wherein at least one restoring spring acts between the closure member parts, said restoring spring restores one of the closure member parts during the movement of the closure member counter to the closing direction into an initial position relative to the other closure member part.

8. The valve according to claim 1, wherein the closure member parts bear against one another via at least one sliding face.

9. The valve according to claim 1, wherein the valve is a vacuum valve.

\* \* \* \* \*